Patented Apr. 14, 1931

1,801,145

UNITED STATES PATENT OFFICE

MAX ENGELMANN AND FOREST J. FUNK, OF WILMINGTON, DELAWARE, ASSIGNORS TO E. I. DU PONT DE NEMOURS & COMPANY, OF WILMINGTON, DELAWARE, A CORPORATION OF DELAWARE

DISINFECTING AGENT

No Drawing. Application filed July 7, 1925. Serial No. 42,079.

This invention relates to materials suitable for use as seed disinfectants, and especially to materials of such character that they may be advantageously incorporated in the dry state with, or applied to, seeds by a dusting process. Particularly the invention relates to compositions depending for their disinfecting power upon relatively water-insoluble organic mercury compounds, either aliphatic or aromatic, and the particular feature of the invention consists in compositions of this character which are composed of the mercury compound alone, or the mercury compound with inert dilutent, no solubilizing agent, or other material for increasing the efficacy of, or rendering available, the mercury compound being used. By solubilizing agents are meant materials such as hydrated lime, powdered oxides or hydroxides of certain metals, and so forth.

It has heretofore been supposed that the disinfecting effect of dry insoluble organic mercury compounds could be made available only by the presence and utilization of a solubilizing reagent; and all our experience previous to the present invention has indicated that only those mercury compounds which are soluble can be effective without the presence of a solubilizing agent. We have now discovered, however, that insoluble compounds, provided they be finely ground, have, despite their insolubility in water, the same effectiveness, when used without a solubilizing agent, as they have when used with such an agent. This discovery enables us to provide highly efficient organic mercury compound disinfectants without having to resort to mixing a solubilizing agent with the mercury compound.

The relatively water-insoluble compound may be any aliphatic or aromatic mercury compound, as p-chlorphenol mercury sulphate, mercurized benzoic acid, mercurized phenol, nitrophenol or naphthol, or mercurized benzol, aniline or nitrobenzol, or mercurized acetone or acetic acid. The compound may be applied in concentrated form or diluted with inert materials, for instance, calcium sulphate (plaster of Paris), kaolin, carbon black, sulphur, calcium carbonate, magnesium silicate or the like.

The mercury compound, in conformity with the invention, should be ground to pass a 100 mesh screen and desirably to pass a 200 mesh, and a finer product, say one that passes a 250 or 300 mesh screen can be used, the finer the grinding, the greater the adherent effect to be expected on seeds and foliages. For the sake of uniformity of product the inert material may be ground to substantially the same degree of fineness as the mercury compound.

In using the disinfectants of the present invention they may be applied to seeds by any efficient dusting process, and by virtue of the fine state of subdivision of the mercury compound the compound is capable of forming a closely adherent coating, and there is produced a disinfectant effect upon the seeds, resulting in the destruction of the spores or germs of plant diseases. The present disinfectants are very effective not only in the disinfecting of seeds but also in the prevention of potato scab and different kinds of leaf diseases of orchard trees.

The following will serve as specific examples of the invention:

(1) A disinfectant composed of organic mercury compound alone; p-chlorphenol mercury sulphate ground to such a fineness that the powder will pass a 200 mesh screen.

(2) A disinfectant composed of organic mercury compound and inert material; 15 parts of p-chlorphenol mercury sulphate ground as specified above and uniformly and thoroughly mixed with 85 parts of calcium sulphate (plaster of Paris) preferably similarly ground. A further example of this type of composition is a mixture of 10 parts of 2, 4 dinitrophenol mercury acetate and 90 parts of kaolin, ground as specified. In this type of composition the proportion of inert material can, of course, be increased or decreased, depending upon the strength desired in any particular case.

In view of what has been stated above and of the above examples, it will be understood that the invention contemplates disinfecting agents which contain an organic mercury compound as the sole active ingredient, the term "active ingredient" being used in the present connection to include materials such as solublizing agents (e. g. powdered oxides or hydroxides of certain metals such as magnesium, calcium, barium, strontium or aluminum) which, although not themselves disinfectants are yet "active ingredients" in that they have been heretofore understood as necessary for proper effectiveness of the mercury compound.

While various water-insoluble organic mercury compounds are within the scope of the invention, as indicated above, we have found particularly desirable compounds in which the mercury atoms are attached directly to atoms of carbon. Examples of these are mercury derivatives of phenols and of aromatic acids in which the mercury atom is attached directly to a ring carbon atom, illustrations of such derivatives being:—

1. Ortho-mercuri-para-nitrophenol (inner anhydride) having the formula:

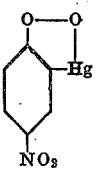

2. Ortho-acetyloxymercuri-phenol:

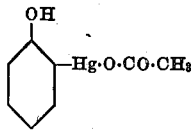

3. 2-mercuri-6-chlorophenol sulphate:

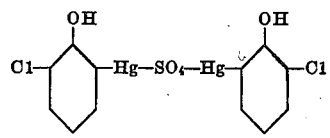

4. Ortho-mercuribenzoic acid (inner anhydride):

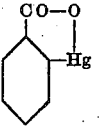

5. 2, 6-mercurichlorobenzoic acid (inner anhydride):

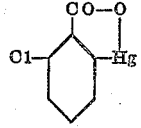

The mercuri-phenols may be obtained by the action of mercury salts on the corresponding phenols; and the mercuri-benzoic acid derivatives may be produced by causing a mercury salt to react with phthalic anhydride or with a salt of phthalic acid, a $CO_2$ group being eliminated.

By the expressions such as "relatively insoluble", and "almost insoluble", in water, as applied to our new compositions and the constituents thereof, we mean a degree of solubility such as that possessed by a material which will not dissolve completely in 15 times its weight of water at 15° C.

In place of the free mercuric-phenols or free mercur-carboxylic acids, the calcium, magnesium, or other alkali-earth metal salt of these mercurized phenols and acids may be used.

Where, in the claims, we describe the disinfecting agent as having as its "sole" active ingredient "a" mercury compound, we have reference to the fact that no solubilizing agent or the like is present, and do not mean to indicate that the claimed agent may not contain a plurality of mercury compounds of the type mentioned herein as disinfectants, as we fully appreciate that an agent of the present type may comprise more than but a single mercury compound and still be within the scope of our invention.

We claim:

1. A disinfecting agent in dust form for seeds and the like having as its sole active ingredient a finely powdered water-insoluble organic mercury compound.

2. A disinfecting agent in dust form for seeds and the like having as its sole active ingredient a finely powdered water-insoluble organic mercury compound, and containing, mixed with the mercury compound, an inert diluent.

3. A composition as set forth in claim 1 in which the proportion of mercury compound is about 10 to 15 per cent of the whole.

4. A disinfecting agent for seeds and the like having as its sole active ingredient a finely powdered water insoluble aromatic mercury compound.

5. A disinfecting agent for seeds and the like having as its sole active ingredient a finely powdered water insoluble aromatic mercury compound in which mercury atoms are attached directly to atoms of carbon.

6. A disinfecting composition for seeds and the like composed of substantially 15 parts of chlorphenol mercury sulphate, powdered to pass a 200 mesh screen, and substantially 85 parts of calcium sulphate.

7. A disinfecting composition for seeds and the like comprising a finely subdivided water-insoluble organic mercury compound, said composition being free from solubilizing agents for said mercury compound.

8. A disinfecting composition for seeds and the like comprising a finely subdivided water-insoluble aromatic mercury compound, which remains substantially undissolved when said composition is mixed with water.

9. A seed disinfecting agent in dust form comprising a water-insoluble organic mercury compound and an inert diluent.

In testimony whereof we affix our signatures.

MAX ENGELMANN.
FOREST J. FUNK.